United States Patent [19]

Peles

[11] Patent Number: 4,761,861
[45] Date of Patent: Aug. 9, 1988

[54] FASTENING MEANS FOR BELTS

[76] Inventor: Eliezer Peles, Kibbutz Afiki, D.N. Jordan Valley, Israel

[21] Appl. No.: 17,707

[22] Filed: Feb. 24, 1987

[51] Int. Cl.⁴ .............................................. A44B 11/10
[52] U.S. Cl. ........................................ 24/196; 24/200; 403/211
[58] Field of Search ................. 24/196, 200, 171, 460, 24/461, 462, 463, 265 R, 265 CW, 265 EE; 280/11 R; 403/211

[56] References Cited

U.S. PATENT DOCUMENTS

| 424,388 | 3/1890 | Weigel | 403/211 |
| 793,751 | 7/1905 | Sykes | 403/211 |
| 1,044,249 | 11/1912 | Ronfet | 403/211 |
| 3,148,427 | 9/1964 | Hoffstrom | 403/211 |
| 3,336,639 | 8/1967 | Rutty et al. | 24/200 |
| 3,766,610 | 10/1973 | Thorsbakken | 403/211 |
| 3,778,072 | 12/1973 | Salomon | 24/196 |
| 3,887,206 | 6/1975 | Salomon | 24/196 |

FOREIGN PATENT DOCUMENTS

| 149800 | 4/1955 | Sweden | 403/211 |
| 442824 | 2/1936 | United Kingdom | 24/196 |

Primary Examiner—Victor N. Sakran
Attorney, Agent, or Firm—Edwin D. Schindler

[57] ABSTRACT

An arrangement for securing a belt against slipping from a holding clamp by forming a loop in the belt and inserting same into a slot of a clamp or a device, a wedge is then inserted into said loop. By pulling the free end of the belt, the loop and wedge enter into said slot.

2 Claims, 1 Drawing Sheet

U.S. Patent    Aug. 9, 1988    4,761,861
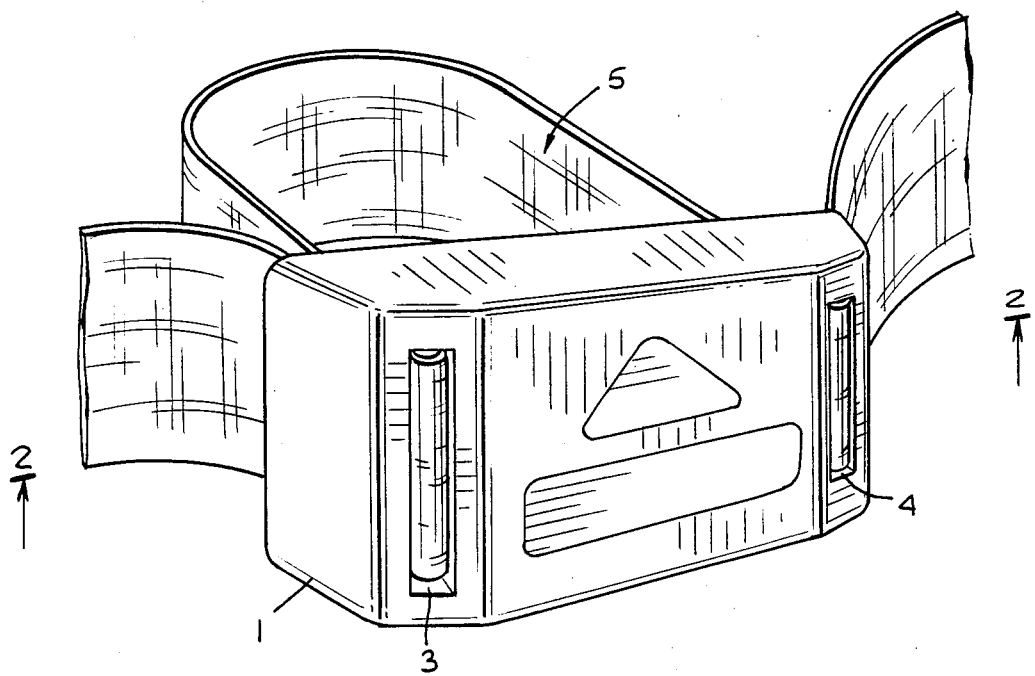
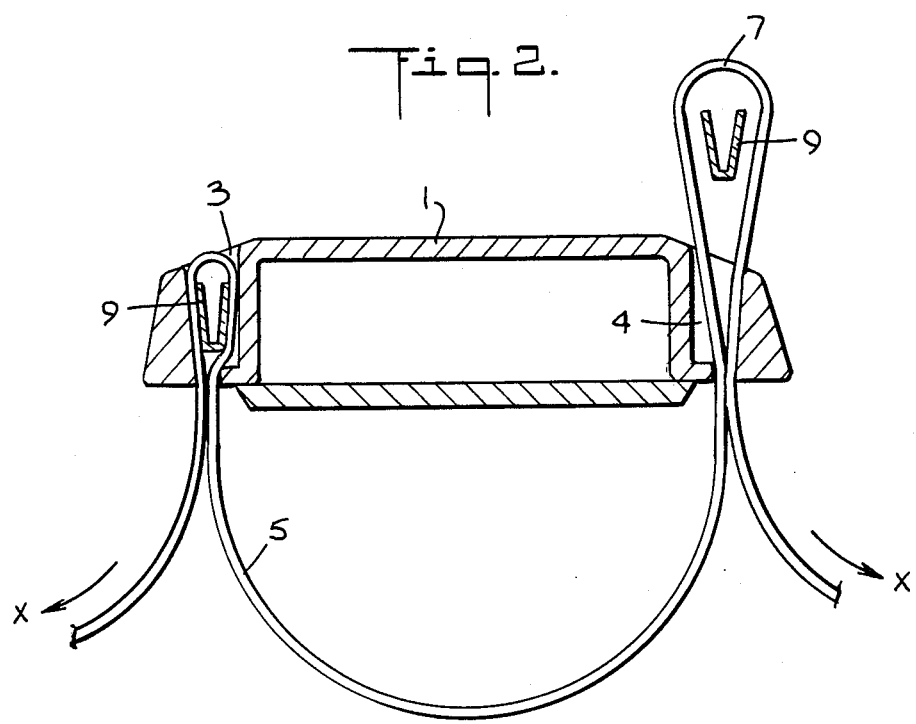

FASTENING MEANS FOR BELTS

FIELD OF THE INVENTION

The present invention relates to a novel arrangement for securing a belt against slipping from a holding clamp or like device, and more particularly to such an arrangement which will prevent the accidental or unintended opening of holding or clamping device.

BACKGROUND OF THE INVENTION

Strips of material such as webbing and belts of the kind which secure or attach equipment or articles of various shapes and sizes to a fixed point—are well known.

In some instances such a belt is designated to secure or hold an article for a short period of time while in other instances an article or device must be immobilized for long periods of time. At any event it is desirous to attach articles in a firm and appropriate manner, more so if said article is to be attached to a moving device such as luggage to a roof rack of a car or a saddle to a horse. It is quite obvious that the vibration of the moving car or the horse loosens the belt clamping device and the equipment or luggage first wobbles and eventually becomes fully detached. In some instances when said equipment is sensitive or costly it might get lost or become damaged so as to cease functioning in a proper manner.

There are known a great number of buckles and securing arrangements for webbing and belts, nonetheless, a simple and cheap arrangement which would incorporate all desired advantages is not in existence.

OBJECTS OF THE INVENTION

It is thus the object of the present invention to provide a device of simple construction which will fulfil all requirements of such a buckle.

It is a further object of the present invention to provide an arrangement which is manually operated without the need of special tools.

It is yet another object of the invention to provide an arrangement in which the forces bringing about the secured position will be greater than those which would cause tearing of the belt itself.

Finally, it is an object of the invention to provide an arrangement which will enable the full re-opening of the buckle and detachment and re-use of the belt.

BRIEF DESCRIPTION OF DRAWINGS

The invention will now be described with reference to the annexed drawings in which:

FIG. 1 is a perspective view of a device employing the buckle according to the invention.

FIG. 2 is a cross section along line II—II of FIG. 1.

DETAILED DESCRIPTION OF THE DRAWINGS

Turning first to FIG. 1 there a device 1 which in the present case may be a small size transmitter which is to be attached to a moving object such as an animal's leg, a cow for instance. The housing of the transmitter is provided with two throughgoing slots 3 and 4 at both ends thereof, the opening of said slots which is farther away from the front of housing being wider than the opposite opening thereof due to a step 2. Into said slots a belt 5 forming a loop is inserted in a manner shown in FIGS. 1 and 2. Into the loop 7 a wedge 9 is inserted.

It is easy to understand that by pulling the end of belt 5 in the direction of arrow X the wedge 9 will enter slot 4, both "arms" of the wedge will become squeezed and enter into the slot in the position shown on the left side of FIG. 2. In such a position the wedge is locked thus blocking belt 5 therein. The wedge 9 is preferably V-shaped or substantially so.

The belt is released by inserting a pin inside the loop and pulling same out.

I claim:

1. Means for fastening a belt to secure the belt against movement relative to an article which the belt is intended to hold, said means for fastening comprising:
    a housing with two throughgoing slots into which loop forming portions of a strip of material are insertable with said loop portions of said material being capable of extending outwardly from said slots; and,
    two substantially hollow V-shaped wedge members with a pair of spaced resilient outwardly flared arms, said arms being formed by said V-shape and extending in said outwardly extending looped portions, each of said wedge members being adaptable to be pulled into one of each of said slots, one opening thereof being narrower than the opposite one thereof constituting a step so that said wedge members are forcibly pulled into each of said slots.

2. Means for fastening a belt to secure the belt against movement relative to an article which the belt is intended to hold, said means for fastening comprising:
    a substantially quadrilaterally-shaped housing with two throughgoing slots located at substantially opposite ends of said housing into which loop forming portions of a strip of material are insertable with said loop portions of said material being capable of extending outwardly from said slots; and
    two substantially hollow V-shaped wedge members with a pair of spaced resilient outwardly flared arms, said arms being formed by said V-shape and extending in said outwardly extending looped portions, each of said wedge members being adaptable to be pulled into one of each of said slots, one opening thereof being narrower than the opposite one thereof constituting a step so that said wedge members are forcibly pulled into each of said slots.

* * * * *